United States Patent
Kaiser et al.

[15] 3,676,435
[45] July 11, 1972

[54] 1-(HYDROXY-1-PHENYL-4-AMINOBUTENYL)ADAMANTANE DERIVATIVES

[72] Inventors: Carl Kaiser, Haddon Heights, N.J.; Charles L. Zirkle, Berwyn, Pa.

[73] Assignee: Smith Kline & French Laboratories, Philadelphia, Pa.

[22] Filed: Aug. 12, 1970

[21] Appl. No.: 63,266

Related U.S. Application Data

[62] Division of Ser. No. 715,507, March 25, 1968, Pat. No. 3,553,225.

[52] U.S. Cl............260/240 TC, 260/247.7 A, 260/268 TR, 260/293.62, 260/570.6, 260/70.8 TC, 260/591, 260/999
[51] Int. Cl....................................C07d 29/16, C07d 29/12
[58] Field of Search............................260/240 TC, 570.8 TC

[56] References Cited

UNITED STATES PATENTS 3,553,225    1/1971    Kaiser et al.....................260/240 TX

*Primary Examiner*—John D. Randolph
*Attorney*—William H. Edgerton, Richard D. Foggio, Joan S. Keps, Arthur R. Eglington, Alan D. Sourie and Joseph A. Marlino

[57] ABSTRACT

1-(1-Hydroxy-1-phenyl-4-aminobutyl)- and 1-(1-phenyl-4-aminobutenyl)-adamantane derivatives in which the phenyl ring may be chloro, trifluoromethyl, methyl, methoxy or methylthio substituted and the amino group may be dilower-alkylamino, N-piperidinyl, N-pyrrolidinyl, N'-lower alkyl-N-piperazinyl or N-morpholinyl are useful as tranquilizers. The compounds are generally prepared by reaction of an appropriate 1-adamantyl phenyl ketone with an aminopropyl magnesium halide to give the hydroxybutanes followed by acid dehydration to furnish the butene derivatives.

3 Claims, No Drawings

1-(HYDROXY-1-PHENYL-4-AMINOBUTENYL)ADAMANTANE DERIVATIVES

This application is a division of application Ser. No. 715,507 filed Mar. 25, 1968 now U.S. Pat. No. 3,553,225 granted Jan. 5, 1971.

This invention relates to novel 1-(1-hydroxy-1-phenyl-4-aminobutyl)- and 1-(1-phenyl-4-aminobutenyl)-adamantane derivatives having useful pharmacodynamic activity. More specifically the compounds of this invention have tranquilizing activity as demonstrated in standard animal behavioral test procedures. Exemplary of the activity shown by the compounds of this invention is the decrease in shock-motivated behavior in squirrel monkeys at oral dosages of from 0.5–20 mg/kg. This activity is characteristic of chlorpromazine-like tranquilizers.

The compounds of this invention are represented by the following general structural formulas:

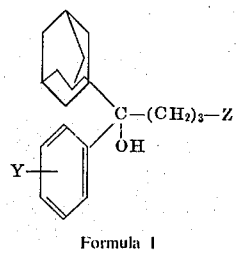 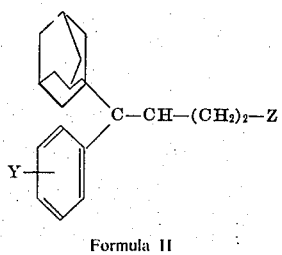

Formula I  Formula II in which:

Y represents hydrogen, chlorine, trifluoromethyl, methyl, methoxy or methylthio; and Z represents diloweralkylamino, N-piperidinyl, N-pyrrolidinyl, N'-lower alkyl-N-piperazinyl or N-morpholinyl.

By the term lower alkyl where used herein, groups having from one to three carbon atoms are indicated.

The compounds of this invention may be used in the form of a pharmaceutically acceptable acid addition salt having the utility of the free base. Such salts, prepared by methods well known to the art, are formed with both inorganic or organic acids, for example: maleic, fumaric, benzoic, oxalic, ascorbic, pamoic, succinic, bismethylene-salicylic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benezenesulfonic, hydrochloric, hydrobromic, sulfuric, sulfamic, phosphoric and nitric acids.

The compounds of this invention are generally prepared by reaction of an appropriately substituted phenyl 1-adamantyl ketone with an aminopropyl magnesium halide (Grignard reagent) to give the hydroxybutyl compounds of formula I. Dehydration of the latter yields the butenyl compounds of formula II. The reaction sequence is shown in the following scheme:

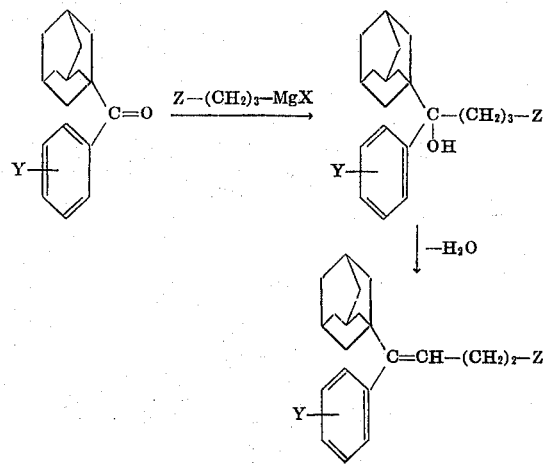

wherein Y and Z are as defined above and X is halogen, preferably chlorine.

More specifically, the above Grignard reaction is advantageously carried out in tetrahydrofuran solution, although other similar nonreactive organic ether-type solvents may be employed, at reflux temperature for from 1 to 4 hours. Usual workup procedures such as hydrolysis with for example aqueous ammonium chloride solution yields the amino-butanol products. The latter are dehydrated advantageously by treatment with acid such as a mineral acid, for example hydrochloric or sulfuric acid, preferably at reflux for from 1 to 8 hours to give the aminobutene products.

The phenyl 1-adamantyl ketone starting materials used as described hereinabove are either known or are prepared by methods known in the art. Thus following the procedure of Stetter and Rauscher, Ber. 93, 1161 (1960), 1-adamantanecarboxylic acid chloride is reacted with a Y-substituted diphenyl cadmium derivative to give the desired ketone.

The compounds of this invention may be administered orally or parenterally in conventional dosage unit forms such as tablets, capsules, injectables or the like, by incorporating the appropriate dose of a compound of formulas I or II with carriers according to accepted pharmaceutical practices.

The foregoing is a general description of how to prepare the compounds of this invention. It will be apparent to one skilled in the art that the compounds of formula I can be present as optical isomers and the compounds of formula II as cis-trans isomers. Where desired these isomers can be separated by standard organic chemical techniques. Unless otherwise noted herein, the description and the attached claims are intended to include mixtures of such isomers as well as the separated isomers themselves.

The following examples illustrate the preparation of specific compounds having tranquilizing activity. However this should not be construed as limiting the scope of the invention since appropriate variations in the starting materials will produce other corresponding products disclosed above.

PREPARATIONS

A. 1-Adamantyl phenyl ketone

A solution of 67 ml. (0.2 m.) of 3M phenyl magnesium bromide in 130 ml. of ether under nitrogen is cooled in an ice bath and 18.9 g. (0.103 m.) of anhydrous cadmium chloride is added. The mixture is allowed to come to room temperature, refluxed for 90 minutes and then 100 ml. of dry benzene is added. The ether is removed (trap) and 28.9 g. (0.145 m.) of 1-adamantanecarboxylic acid chloride in 100 ml. of dry benzene is added over 15 minutes. The resulting mixture is stirred and refluxed for one hour, then cooled in an ice bath. Cold water (75 ml.) is added slowly, followed by 20 percent sulfuric acid solution until the appearance of two layers. The aqueous layer is extracted with ether and the extract combined with the organic layer which is washed with water and a saturated sodium chloride solution. The dried solution is evaporated to give 1-adamantyl phenyl ketone, m.p. 43°–46° C.

B. 1-Adamantyl Y-substituted phenyl ketones

By employing in Part A, Y-substituted phenyl magnesium bromide prepared from bromobenzenes such as noted below, there is obtained the corresponding 1-adamantyl Y-substituted phenyl ketone starting materials:

2,3 or 4-bromochlorobenzene
2,3 or 4-bromobenzotrifluoride
2 or 4-bromotoluene
4-bromoanisole
4-bromothioanisole.

EXAMPLE 1

To 1.2 g. of magnesium in 5 ml. of tetrahydrofuran is added 10 ml. of a solution of 8.1 g. (0.05 m.) of 1-(3-chloropropyl)-piperidine in tetrahydrofuran and the mixture is refluxed for 90 minutes. The mixture is cooled in an ice bath and 7.2 g. (0.03 m.) of 1-adamantyl phenyl ketone in 30 ml. of tetrahydrofuran is added. After refluxing for 90 minutes the reaction mixture is poured into a solution of 7 g. of ammonium chloride in 250 ml. of cold water with stirring. The resulting mixture is extracted with ether and the dried extract evaporated to give 1[1-hydroxy-1-phenyl-4-(N-piperidinyl)-butyl]-adamantane, m.p. 108°–109° C.

Similarly, by employing an equivalent amount of 1-adamantyl 2,3 or 4-chlorophenyl ketone in the above reaction there is obtained the corresponding 1-[1-hydroxy-1-(2,3 or 4-chlorophenyl)-4-(N-piperidinyl)-butyl]-adamantane derivative, respectively.

EXAMPLE 2

A mixture of 6.0 g. (0.16 m.) of 1-[hydroxy-1-phenyl-4-(N-piperidinyl)-butyl]-adamantane and 75 ml. of concentrated hydrochloric acid is stirred and refluxed for 90 minutes. The reaction mixture is concentrated in vacuo, dissolved in water, made basic and extracted with ether. The ether extract is evaporated to give 1-[1-phenyl-4-(N-piperidinyl)-butenyl]-adamantane, maleate salt m.p. 196°–198° C.

Similar treatment as described above of the chlorophenyl analogues prepared as in Example 1, yields the corresponding 1-[1-(2,3 or 4-chlorophenyl)-4-(N-piperidinyl)-butenyl]-adamantane derivative, respectively.

EXAMPLE 3

Following the procedures of Examples 1 and 2, 1-adamantyl4-trifluoromethylphenyl ketone is reacted with the Grignard reagent formed from 3-(dimethylaminopropyl)-chloride to give 1-[1-hydroxy-1-(4-trifluoromethylphenyl)-4-(N,N-dimethylamino)-butyl]-adamantane which is dehydrated with hydrochloric acid to the 1-[1-(4-trifluoromethylphenyl) -4-(N,N-dimethylamino)-butenyl]-adamantane.

EXAMPLE 4

Following the procedures of Examples 1 and 2, 1-adamantyl 2-tolyl ketone is reacted with the Grignard reagent formed from 1-(3-chloropropyl)-pyrrolidine to give 1-[1-hydroxy-(1-(2-tolyl)-4-(N-pyrrolidinyl)-butyl]-adamantane which is dehydrated by treatment with hydrochloric acid to yield 1-[1-(2-tolyl)-4-(N-pyrrolidinyl)-butenyl]-adamantane.

Similarly, use of 1-adamantyl 4-tolyl ketone as described above results in the formation of 1-[1-hydroxy-1-(4-tolyl)-4-(N-pyrrolidinyl)-butyl]-adamantane and 1-[1-(4-tolyl)-4-(N-pyrrolidinyl)-butenyl]-adamantane.

EXAMPLE 5

Following the procedures of Examples 1 and 2, 1-adamantyl 4-methoxyphenyl ketone is reacted with the Grignard reagent formed from 1-(3-chloropropyl)-morpholine to give 1-[1-hydroxy-1-(4-methoxyphenyl)-4-(N-morpholinyl)-butyl]-adamantane which is dehydrated with hydrochloric acid to the 1-[1-(4-methoxyphenyl)-4-(N-morpholinyl)-butenyl]-adamantane.

EXAMPLE 6

Following the procedures of Examples 1 and 2, 1-adamantyl 4-methylthiophenyl ketone is reacted with the Grignard reagent formed from N-(3-chloropropyl)-N'-methyl-piperazine to give 1-[1-hydroxy-1-(4-methylthiophenyl)-4-(N'-methyl-N-piperazinyl)-butyl]-adamantane which is treated with hydrochloric acid to give the dehydrated product, 1-[1-(4-methylthiophenyl)-4-(N'-methyl-N-piperazinyl)-butenyl]-adamantane.

What is claimed is:

1. A chemical compound having the following formula

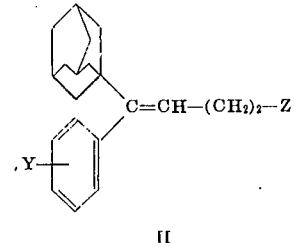

II or a pharmaceutically acceptable acid addition salt thereof, wherein:

Y is hydrogen, chlorine, trifluoromethyl, methyl, methoxy or methylthio; and

Z is diloweralkylamino, N-piperidinyl, N-pyrrolidinyl, N'-lower alkyl-N-piperazinyl or N-morpholinyl, said lower alkyl moieties having from one to three carbon atoms.

2. A chemical compound according to claim 1 in which Y is hydrogen.

3. A chemical compound according to clam 1 in which Z is N-piperidinyl, being the compound 1[1-phenyl-4-(N-piperidinyl)-butenyl]-adamantane.

* * * * *